United States Patent [19]

Bando

[11] Patent Number: 5,754,519
[45] Date of Patent: May 19, 1998

[54] AUTOMATIC DISK CHANGER HAVING A LOADING MECHANISM AND DISK MOUNTING MECHANISM DRIVEN BY A ROTATABLE CAM

[75] Inventor: Takayoshi Bando, Daito, Japan

[73] Assignee: Funai Electric Co., Ltd., Osaka, Japan

[21] Appl. No.: 714,593

[22] Filed: Sep. 16, 1996

[30] Foreign Application Priority Data

Sep. 20, 1995 [JP] Japan ................. 7-241604

[51] Int. Cl.⁶ .................... G11B 17/04; G11B 17/22
[52] U.S. Cl. ............... 369/192; 369/178; 369/36
[58] Field of Search ................. 369/36, 75.1, 77.1, 369/77.2, 178, 191, 192; 360/92, 96.5, 99.02, 98.04

[56] References Cited

U.S. PATENT DOCUMENTS

| | | | |
|---|---|---|---|
| 4,602,361 | 7/1986 | Kumaki et al. | 369/77.2 |
| 4,701,900 | 10/1987 | Hasegawa et al. | 369/36 |
| 4,829,501 | 5/1989 | Seto et al. | 369/75.2 |
| 5,172,361 | 12/1992 | Urushibata et al. | 369/77.1 |
| 5,218,593 | 6/1993 | Kaneo et al. | 369/77.1 |
| 5,299,185 | 3/1994 | Sakurai et al. | 369/75.2 |
| 5,386,403 | 1/1995 | Morioka et al. | 369/37 |
| 5,467,333 | 11/1995 | Ji | 369/75.2 |
| 5,550,801 | 8/1996 | Enomoto et al. | 369/178 |
| 5,574,705 | 11/1996 | Suzuki | 369/36 |
| 5,629,923 | 5/1997 | Hisatomi | 369/75.2 |

FOREIGN PATENT DOCUMENTS 61-156563  7/1986  Japan .

*Primary Examiner*—Jefferson Evans
*Attorney, Agent, or Firm*—Bacon & Thomas

[57] ABSTRACT

An automatic disk changer has a housing which accommodates a disk arranging stand on which a number of disks are arranged at predetermined intervals, and a carriage which is movable forwardly and backwardly along the disk arranging stand. The carriage has a loading mechanism which is adapted to take a desired disk out of the group of disks arranged on the disk arranging stand and place it on the carriage, and a disk mounting mechanism which is adapted to mount on a player body the disk thus placed on the carriage. In the automatic disk changer thus organized, a cam is provided on the carriage in such a manner that it is rotatable to drive the loading and disk mounting mechanisms. In addition, a locking pin is provided which is driven by the cam to detachably engaged with the disk arranging stand to lock the carriage at a predetermined position.

3 Claims, 15 Drawing Sheets

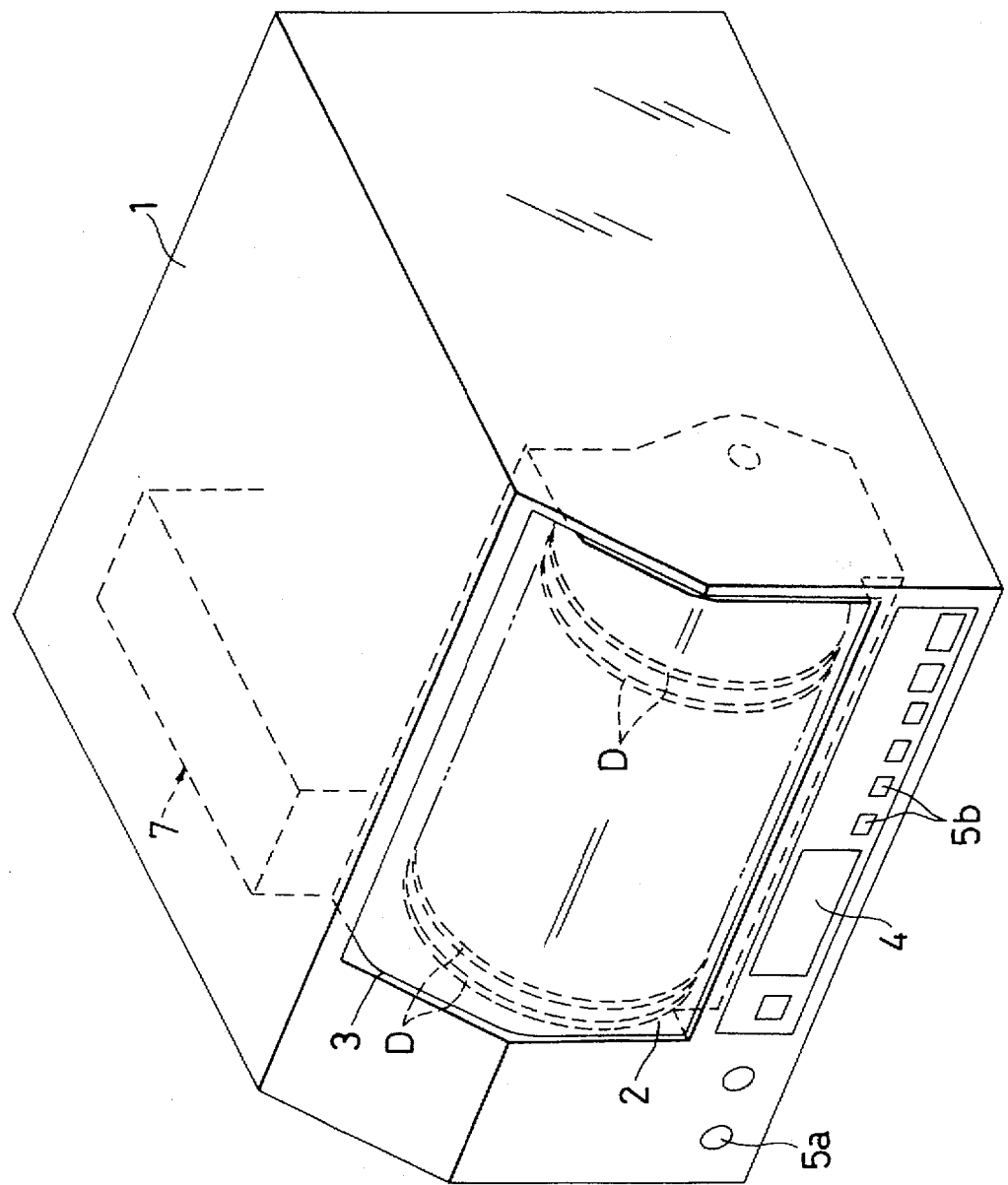

AUTOMATIC DISK CHANGER HAVING A LOADING MECHANISM AND DISK MOUNTING MECHANISM DRIVEN BY A ROTATABLE CAM

BACKGROUND OF THE INVENTION

1. Field of the Invention

This invention relates to an automatic disk changer which operates to take a desired one out of a group of optical disks or magnet-optical disks such as so-called compact disks (CDs) and mini-disks (MDs) (hereinafter referred to merely as "disks", when applicable), and reproduce, record and/or erase with respect to the disk.

2. Description of the Related Art

An example of an automatic disk changer of this type has been disclosed in Japanese Patent Unexamined Publication No. Sho. 61-156563. The automatic disk changer comprises a disk arranging stand, and a carriage which are arranged in a housing. On the disk arranging stand, a plurality of disks are arranged at predetermined intervals. The carriage is movable forwardly and backwardly along the disk arranging stand. The carriage has: a disk lifting mechanism for slightly lifting a desired disk from the disk arranging stand; a loading mechanism for loading on the carriage the disk thus lifted; and a disk mounting mechanism for mounting the disk on the player body provided on the carriage.

The above-described automatic disk changer is disadvantageous in that it is complex in structure and high in manufacturing cost because the disk lifting mechanism, the loading mechanism, and the disk mounting mechanism are driven by their own individual drive sources.

SUMMARY OF THE INVENTION

In view of the foregoing, an object of the invention is to provide an automatic disk changer which is simple in structure and low in manufacturing cost.

In order to achieve the above object, the invention provides an automatic disk changer comprising: a housing; a disk arranging stand, provided within the housing, on which a number of disks are arranged at predetermined intervals; and a carriage which is provided within the housing and is movable forwardly and backwardly along the disk arranging stand, the carriage including: a loading mechanism for taking a desired disk out of the disks arranged on the disk arranging stand and placing the desired disk on the carriage; a disk mounting mechanism for mounting on a player body the disk thus placed on the carriage; and a rotatable cam for driving the loading mechanism and the disk mounting mechanism.

BRIEF DESCRIPTION OF THE DRAWINGS

FIG. 19 is a perspective view of the automatic disk changer.

DETAILED DESCRIPTION OF THE PREFERRED EMBODIMENT

Figure 1:
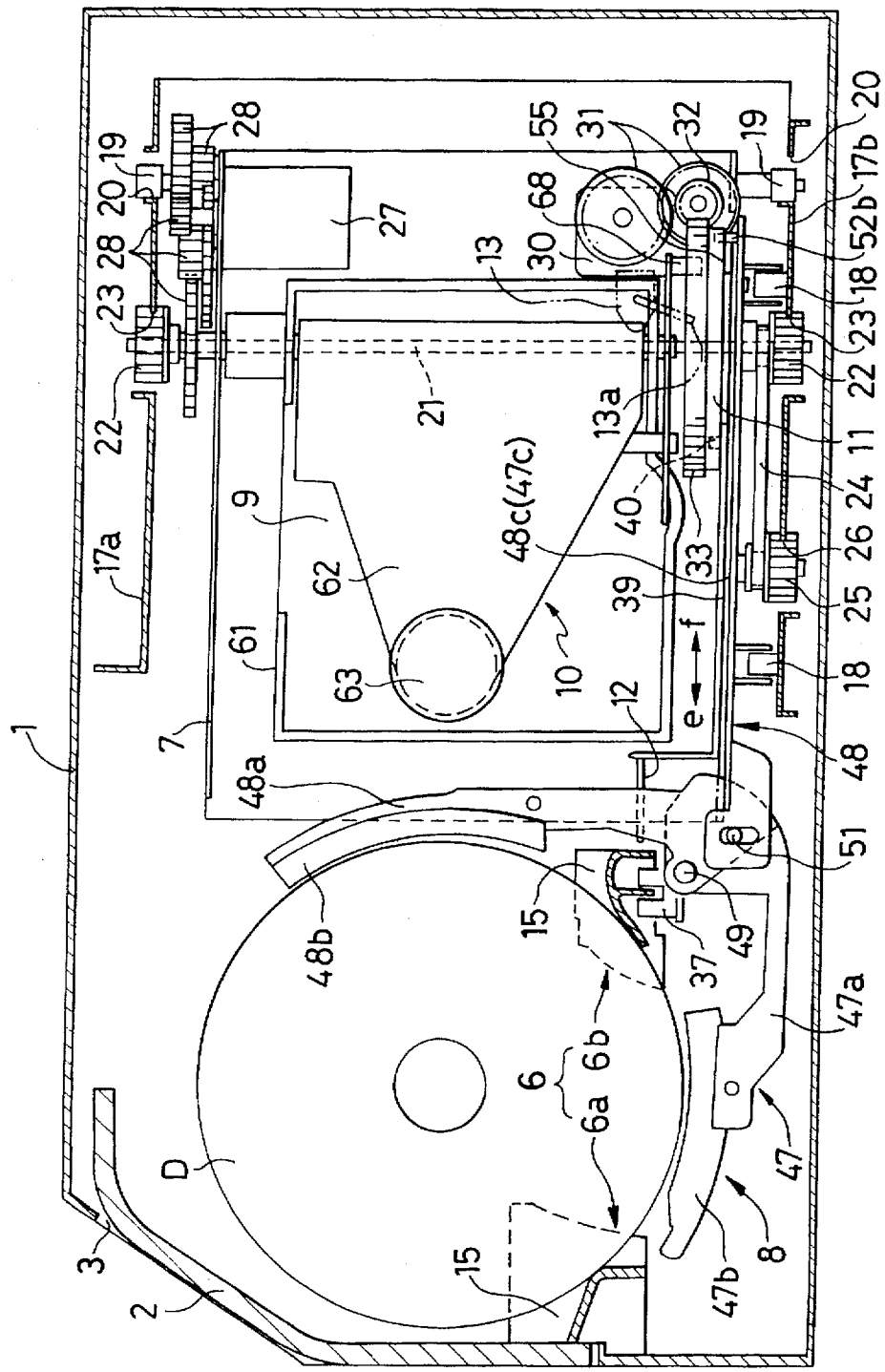
FIG. 1 is a vertical sectional view showing an automatic disk changer, which constitutes a preferred embodiment of the invention.

An automatic disk changer, which constitutes a preferred embodiment of the invention, will be described with reference to the accompanying drawings. FIG. 19 shows the automatic disk changer according to the embodiment. As shown in FIG. 19, a housing 1 has an opening 3 in the upper portion of its front wall through which a disk D is put in the housing or taken out of the housing, and the opening 3 has a lid 2 which is swung to open and close the opening 3. Furthermore, the housing 1 has a display section 4 and various operating switches such as a power switch 5a and disk specifying switches 5b on the lower portion of the front wall.

Figure 2:
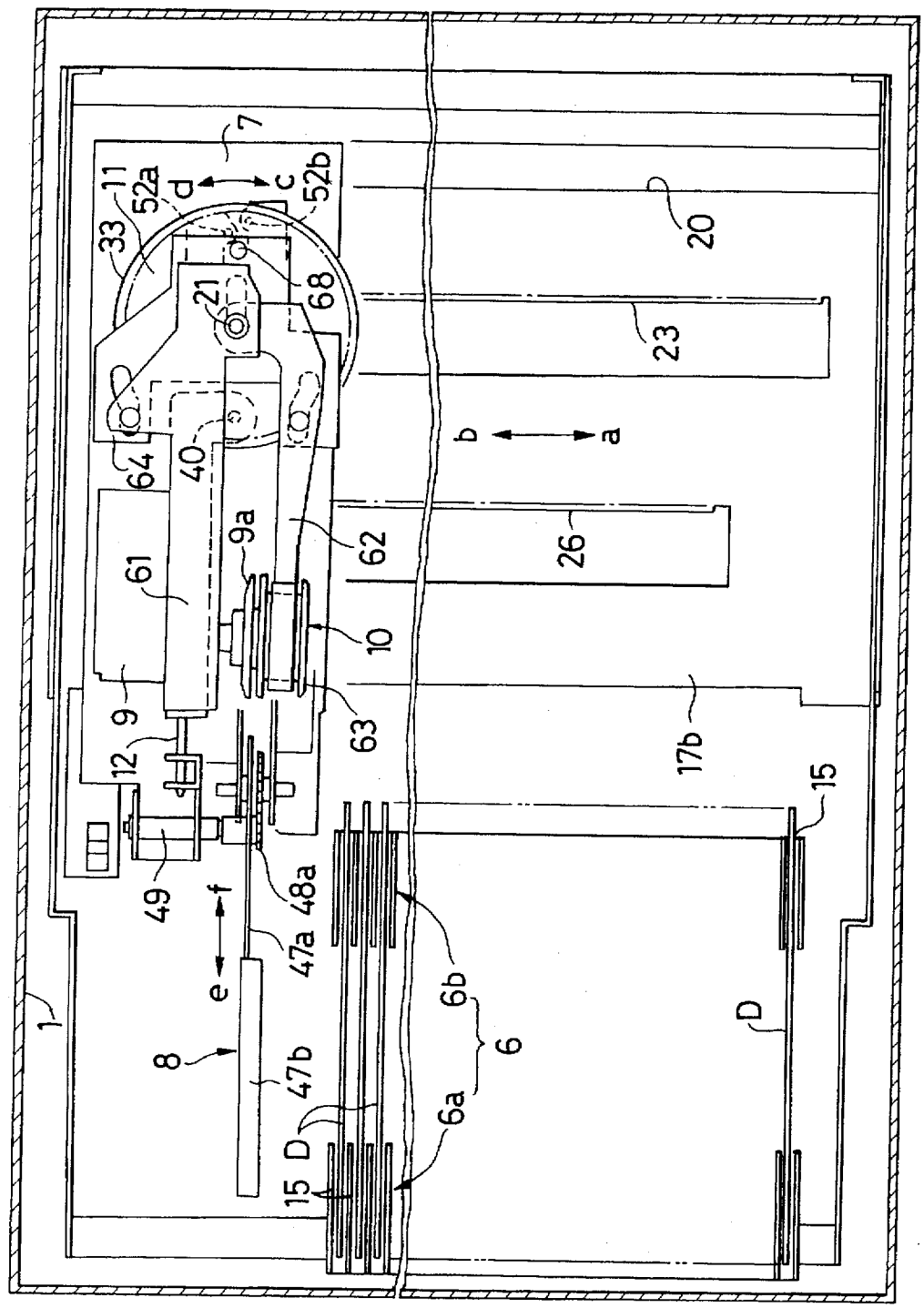
FIG. 2 is a horizontal sectional view of the automatic disk changer shown in FIG. 1.

As shown in FIGS. 1 and 2, a disk arranging stand 6 on which a number of disks D are arranged at predetermined intervals, and a carriage 7 which is movable in the directions of the arrows a and b along the disk arranging stand 6 are provided in the housing 1. The carriage 7 has a loading mechanism 8 which takes a desired one of the disks D on the disk arranging stand 6 and places it on the carriage 7, and a disk mounting mechanism 10 which mounts the disk D on a player body 9 provided on the carriage 7. A cam 11 for driving the aforementioned two mechanisms 8 and 10 is rotatably mounted on the carriage 7. In addition, a locking pin 12 is provided in the housing 1. The locking pin 12 is driven by the cam 11 so that it detachably engages with the disk arranging stand 6 (or a predetermined member to be engaged therewith), whereby the carriage 7 is locked at a predetermined position. Moreover, a cam stop switch 13 is provided between the carriage 7 and the cam 11, to detect when the cam 11 turns through a predetermined angle of rotation in the forward direction or in the reverse direction, thus reaching a predetermined stop position.

The disk arranging stand 6, as shown in FIGS. 1 and 2, comprises a front line section 6a and a rear line section 6b which are arranged in parallel with each other and are spaced a predetermined distance from each other. Those sections 6a and 6b have a number of grooves 15 which are arranged at predetermined intervals in the directions of the arrows a and b. The disks D are inserted in the grooves 15 thus arranged.

As shown in FIGS. 1 and 2, the carriage 7 is provided between an upper base board 17a and a lower base board 17b which are secured to the housing 1, and is mounted through wheels 18 on the lower base board 17b. Furthermore, the carriage 7 has lateral vibration preventing rolls 19 which are extended from the upper and lower portions of the carriage 7, respectively, in such a manner that they are rollingly in abutment with the sides of elongated holes 20 formed in the upper and lower base boards 17a and 17b, respectively. A supporting shaft 21 penetrates the carriage 7 vertically, and has a pair of pinions 22 fixedly mounted on its both end portions in such a manner that the pinions 22 are engaged with a pair of racks 23 of the upper and lower base boards 17a and 17b. The lower pinion 22 is coupled through an endless belt 24 to a pinion 25 which is engaged with a rack 26 of the lower base board 17b. Hence, when a carriage motor 27 mounted on the upper portion of the carriage 7 is driven, the pinions 22 and 25 are turned in the forward direction or in the backward direction, whereby the carriage 7 can be moved in the directions of the arrows a and b.

As shown in FIGS. 1 and 2, the cam 11 is mounted on the shaft 21 on the carriage 7 in such a manner that it is rotatable in the forward and reverse directions of the arrows c and d. Hence, as a cam motor 30 mounted on the lower portion of the carriage 7 is driven, the cam 11 is turned in the forward direction or in the reverse direction through a gear mechanism 31, a worm 32, and a gear 33 formed in the outer periphery of the cam 11.

Figure 3:
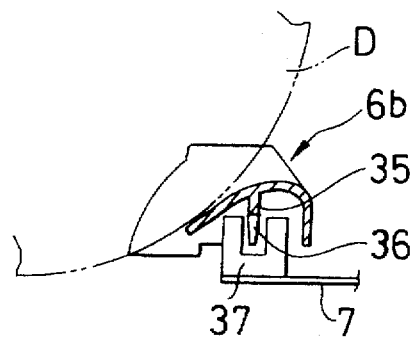
FIG. 3 is a cross sectional view of a rear line section of a disk arranging stand in the automatic disk changer.
Figure 4:
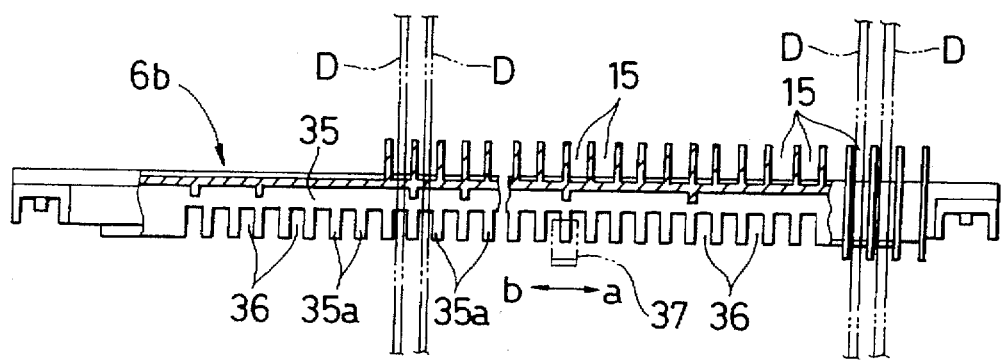
FIG. 4 is a vertical sectional view of the rear line section shown in FIG. 3.

As shown in FIGS. 3 and 4, an intermediate plate 35 is extended downwardly from the middle of the lower surface of the aforementioned rear line section 6b, and a number of slits 36 are formed in the intermediate plate 35 at predetermined intervals in the directions of the arrows a and b. In addition, a photo-detector 37 comprising a light emitting unit and a light receiving unit is provided on the carriage 7 with the intermediate plate 35 between those units. On the other hand, when the slits 36 are formed in the intermediate plate 35, protruded pieces 35a are accordingly formed between them. Hence, as the carriage 7 is moved in the directions of the arrows a and b, the light beam emitted from the light emitting unit towards the light receiving unit is intercepted by the protruded pieces 35a of the intermediate plate 35. Hence, by counting the pulse signal which the photo-detector 37 outputs whenever the light beam is intercepted in the above-described manner, the position of the carriage 7 can be detected.

Figure 5:
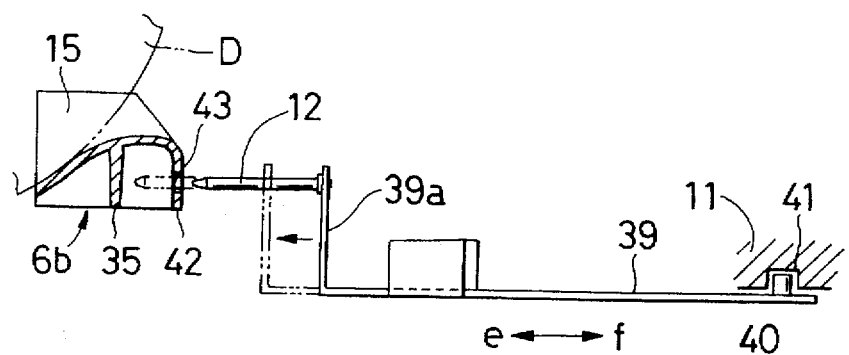
FIG. 5 is a cross sectional view showing a locking pin and its relevant components in the automatic disk changer.
Figure 6:
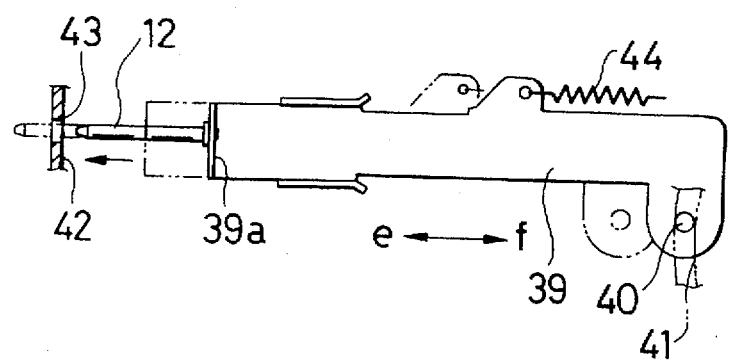
FIG. 6 is a plan view of the components shown in FIG. 5.
Figure 7:
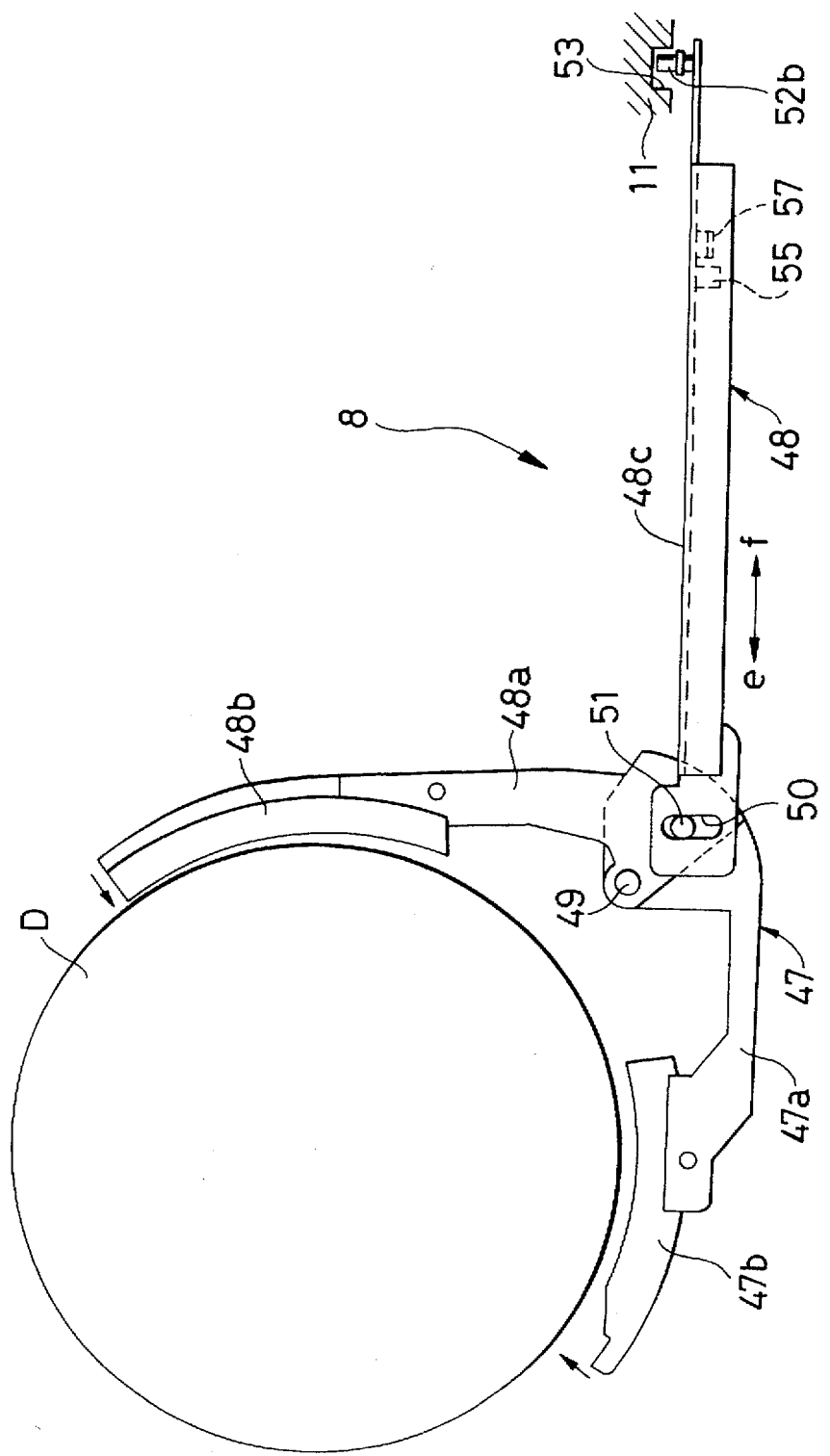
FIG. 7 is a side view showing a loading mechanism before it loads a disk in the automatic disk changer.
Figure 8:
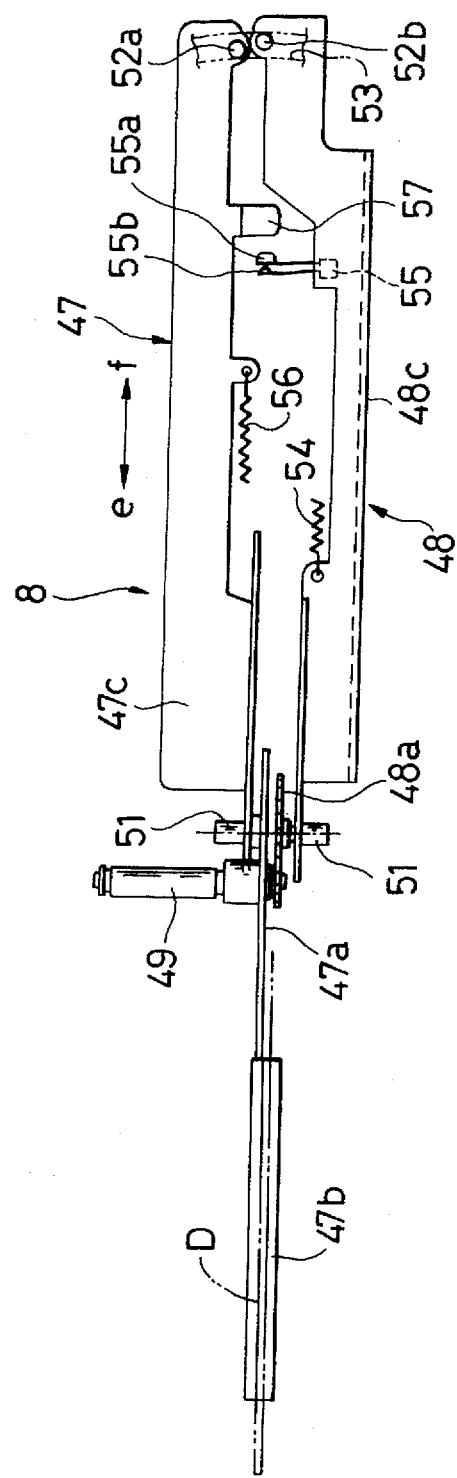
FIG. 8 is a plan view of the loading mechanism shown in FIG. 7.

As shown in FIGS. 5 and 6, a substantially L-shaped movable plate 39 is provided on the carriage 7 in such a manner that it is movable in the directions of the arrows e and f, and the aforementioned locking pin 12 is protruded from the raised portion 39a of the movable plate 39 in such a manner that it is extended in the directions of the arrows of e and f. Furthermore, the movable plate 39 has a cam pin 40 on the upper surface of its rear end portion. The cam pin 40 is engaged with a locking-pin cam groove 41 formed in the lower surface of the cam 11. Furthermore as shown in FIGS. 7 and 8, a number of locking holes 43 (which are to be selectively engaged with the locking pin) are formed in the rear plate 42 of the rear line section 6b in the directions of the arrows a and b at the same intervals as the grooves 15. The movable plate 39 is urged backwardly by a tension spring 44.

Figure 16A:
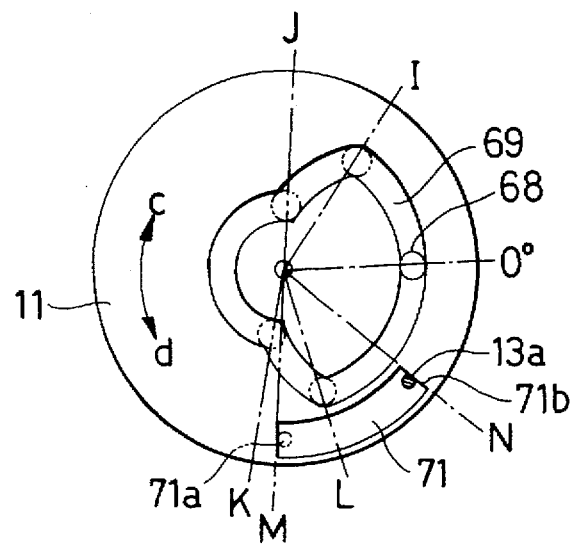
FIGS. 16 (a), 16 (b) and 16 (c) are plan views outlining a cam in the automatic disk changer.
Figure 16B:
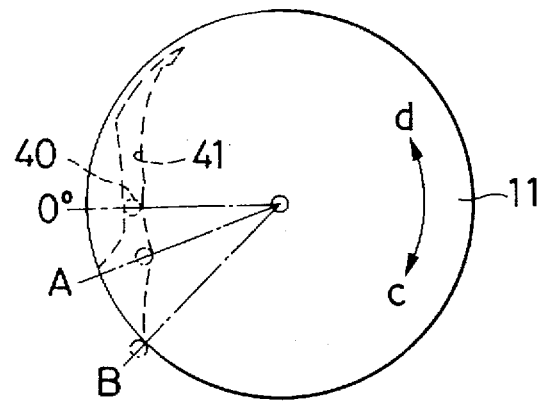
Figure 16C:
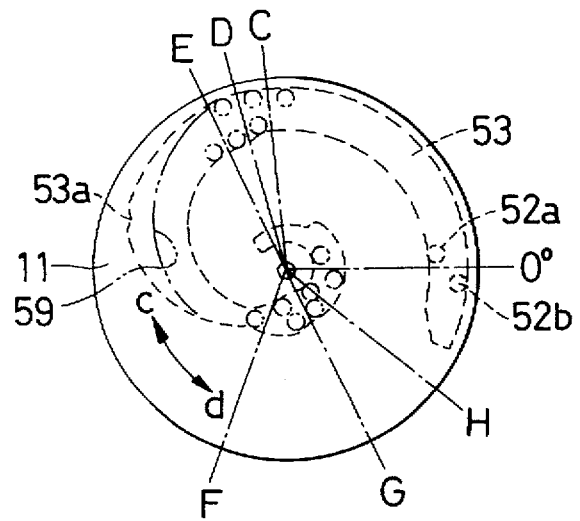
Figure 17:
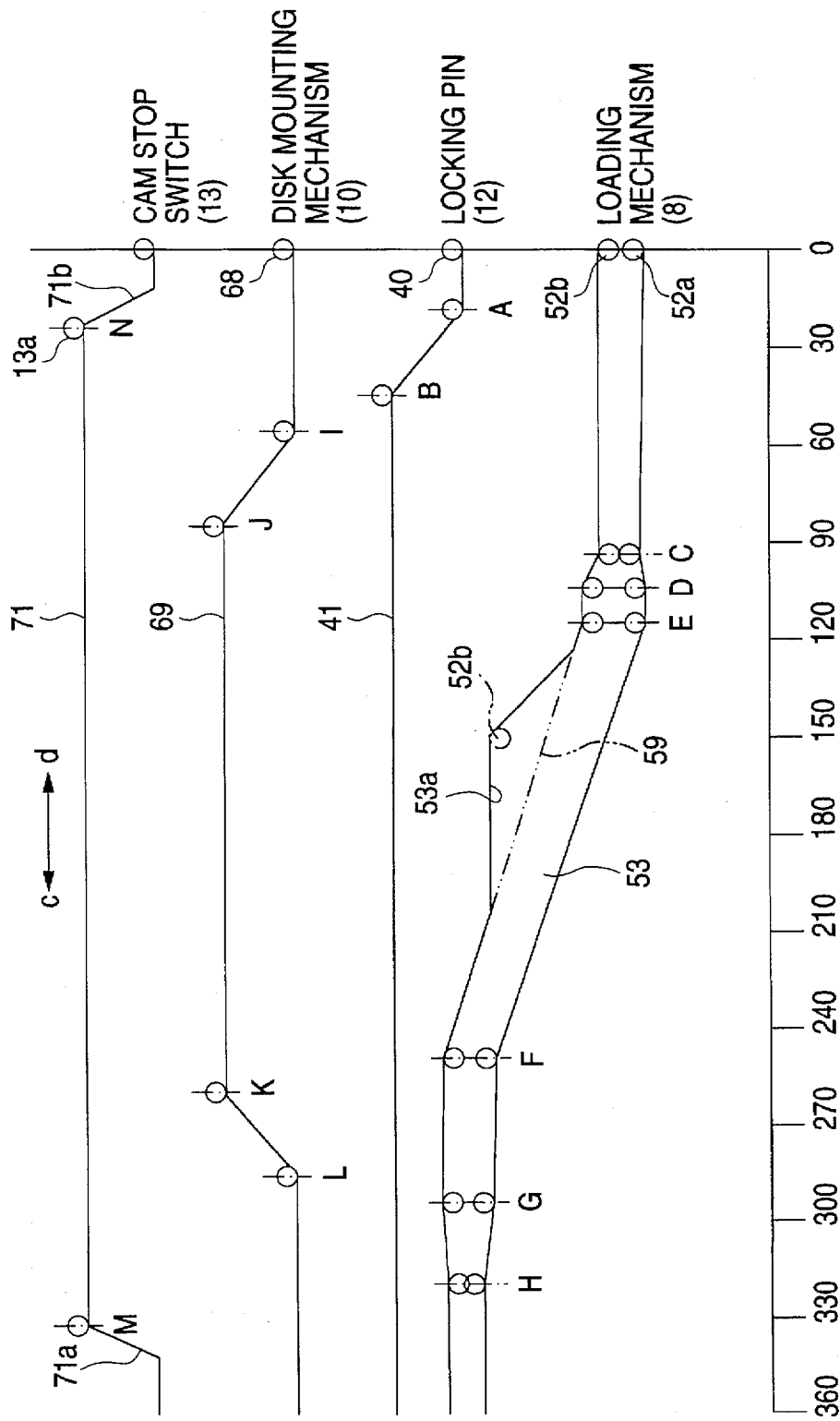
FIG. 17 is a timing chart for a description of the operation of the automatic disk changer.

When, in the automatic disk changer thus constructed, the carriage 7 is stopped at a specified disk D, and the cam 11 is turned in the forward direction of the arrow c, then as shown in FIGS. 16 (b) and 17, the cam pin 40 is moved forwardly (in the direction of the arrow e) from the time instant that the cam 11 reaches the position A (21°) from the zero position (0°), and when the cam 11 comes to the position B (45°), the forward movement (in the direction of the arrow e) of the cam pin 40 is suspended, so that the locking pin 12 is inserted into the locking hole 43 (as indicated by the phantom lines in FIGS. 5 and 6), whereby the carriage 7 is locked at the desired position. When the cam 11 is turned in the reverse direction (in the direction of the arrow d), as opposed to the above-described operation the cam pin 40 is retracted (in the direction of the arrow f), whereby the locking pin 12 is disengaged from the locking hole 43 (as indicated by the solid lines in FIGS. 5 and 6). Hence, the carriage 7 can be moved in the directions of the arrows a and b.

The aforementioned loading mechanism 8, as shown in FIGS. 7 and 8, comprises: a lower loading section 47 which is confronted with the lower edge of a disk D; and a side loading section 48 which is confronted with one side edge of the disk D. The loading sections 47 and 48 comprise: a pair of disk clamping arms 47a and 48a, disk clamping pieces 47b and 48b, and coupling bars 47c and 48c, respectively. The disk clamping arms 47a and 48a are arranged to form about 90° with each other, and have their base end portions mounted on the carriage 7 through a pivotally supporting shaft 49 in such a manner that the disk clamping arms 47a and 48a are swingable about the shaft 49. The disk clamping pieces 47b and 48b are arcuate, and are swingably coupled to the end portions of the arms 47a and 48a, respectively. The coupling bars 47c and 48c are supported on the carriage 7 in such a manner that they are movable in the directions of the arrows e and f. Furthermore the coupling bars 47c and 48c have vertically elongated holes 50 in the end portions. The holes 50 are engaged with engaging pins 51 which are extended from the base end portions of the arms 47a and 48a, respectively. Cam pins 52a and 52b are embedded in the upper surfaces of the rear end portions of the coupling bars 47c and 48c. The cam pins 52a and 52b are engaged with a loading cam groove 53 which is formed in the lower surface of the cam 11. A spring 54 urging the coupling bar 48c backwardly, and a disk detector 55 made up of a limit switch or the like are connected to the coupling bar 48c of the side loading section 48; while a spring 56 urging the coupling bar 47c forwardly, and a protruded piece 57 which is confronted with detecting units 55a and 55b of the disk detector 55 are connected to the coupling bar 47c of the lower loading section 47.

Before a disk D is held with the loading mechanism 8, as shown in FIGS. 7 and 8 the disk clamping pieces 47b and 48b are spaced away from the disk D. Hence, when the carriage 7 is moved in the directions of the arrows a and b, the disk clamping pieces 47b and 48b will never collide with the disks D.

Figure 9:
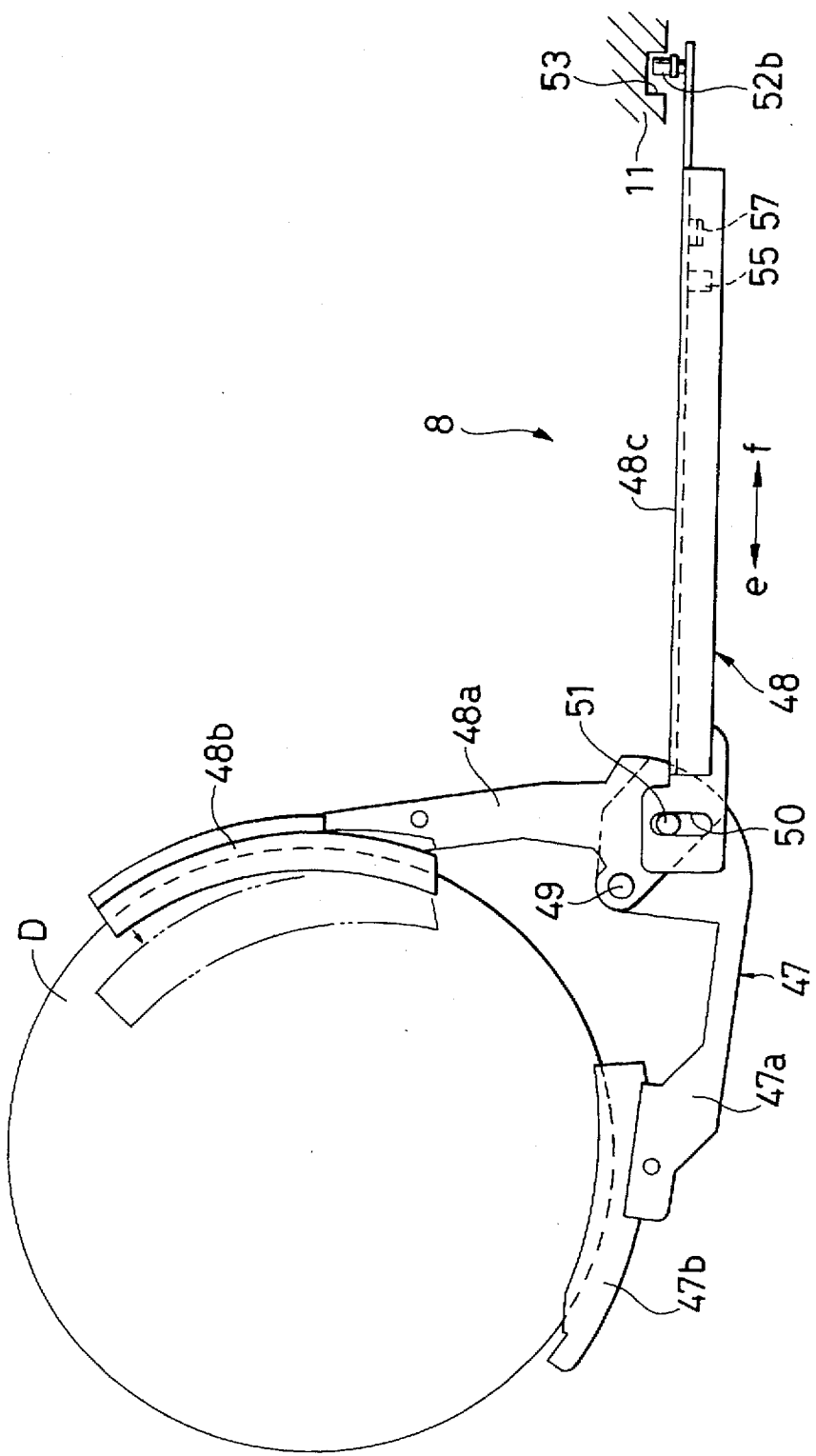
FIG. 9 is a side view showing the loading mechanism which has held a disk.
Figure 10:
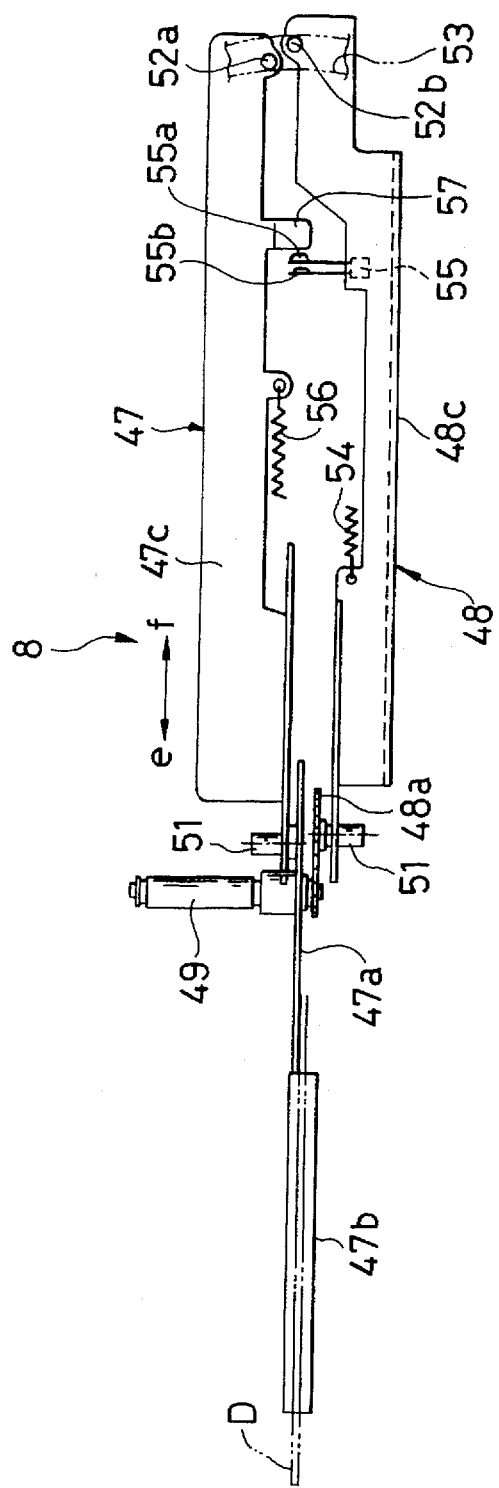
FIG. 10 is a plan view of the loading mechanism shown in FIG. 9.

Next, when the carriage 7 is stopped at the specified disk D, and the cam 11 is turned in the forward direction (of the arrow c), as shown in FIGS. 16 (c) and 17 the disk clamping arms 47a and 48a are held spaced away from the disk D. (as shown in FIGS. 7 and 8) until the cam 11 is turned to the position C (95°) from the zero position (0°), and, while the cam 11 turns to the position E (115°) from the position D (105°), the cam pins 52a and 52b are pressed by the cam groove 53. As a result, as indicated by the solid lines in FIG. 9 and shown in FIG. 10, the coupling bar 47c of the lower loading section 47 is moved forwardly (in the direction of the arrow e), while the coupling bar 48c of the side loading section 48 is moved backwardly (in the direction of the arrow f), so that the disk D is held with the disk clamping arms 47a and 48a.

Figure 11:
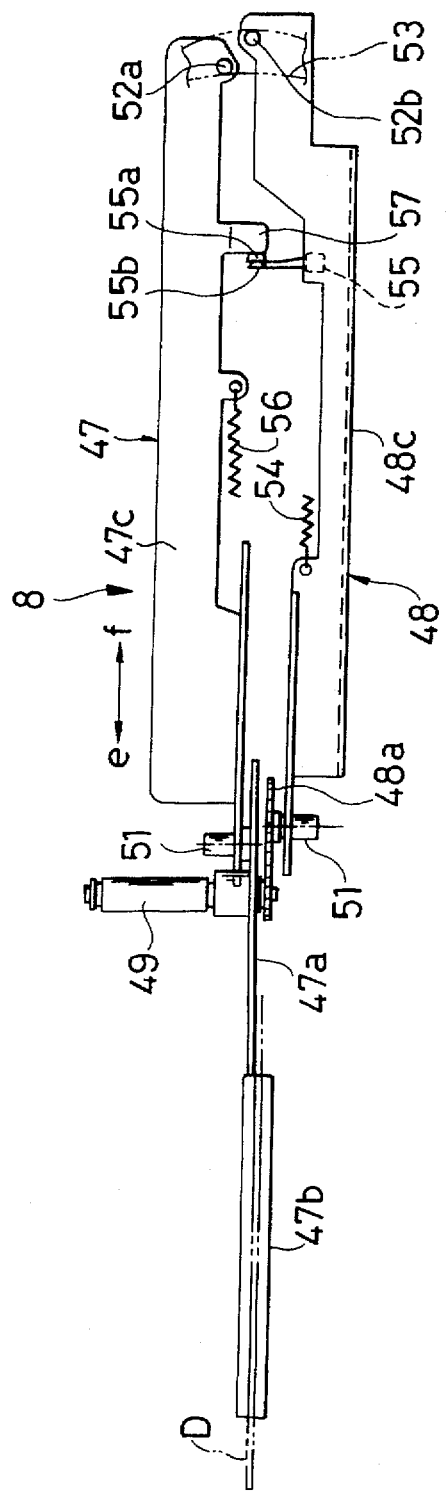
FIG. 11 is a plan view showing a state of the loading mechanism in the case where a specified disk is not present in a group of disks.

A recess 53a is formed in the outer wall Of the cam groove 53 in such a manner that it is extended from the position E to the position F (250°). Hence, in the case where the disk D is held with the disk clamping arms 47a and 48a, the cam pin 52b is moved along the phantom line 59 irrespective of the recess 53a. On the other hand, in the case where the specified disk D is not present; that is, in the case where it is impossible for the disk clamping arms 47a and 48a to hold the disk, as indicated by the phantom lines in FIG. 9 the disk clamping arm 48a of the side loading section 48 is swung forwardly, and accordingly the coupling bar 48c is moved backwardly (in the direction of the arrow f), and the cam pin 52b is moved along the recess 53a. Hence, as shown in FIG. 11, the detecting units 55a and 55b of the disk detector 55 is abutted against the protruded piece 57, so that the disk detector 55 is activated to detect that the disk D is not present.

Figure 12:
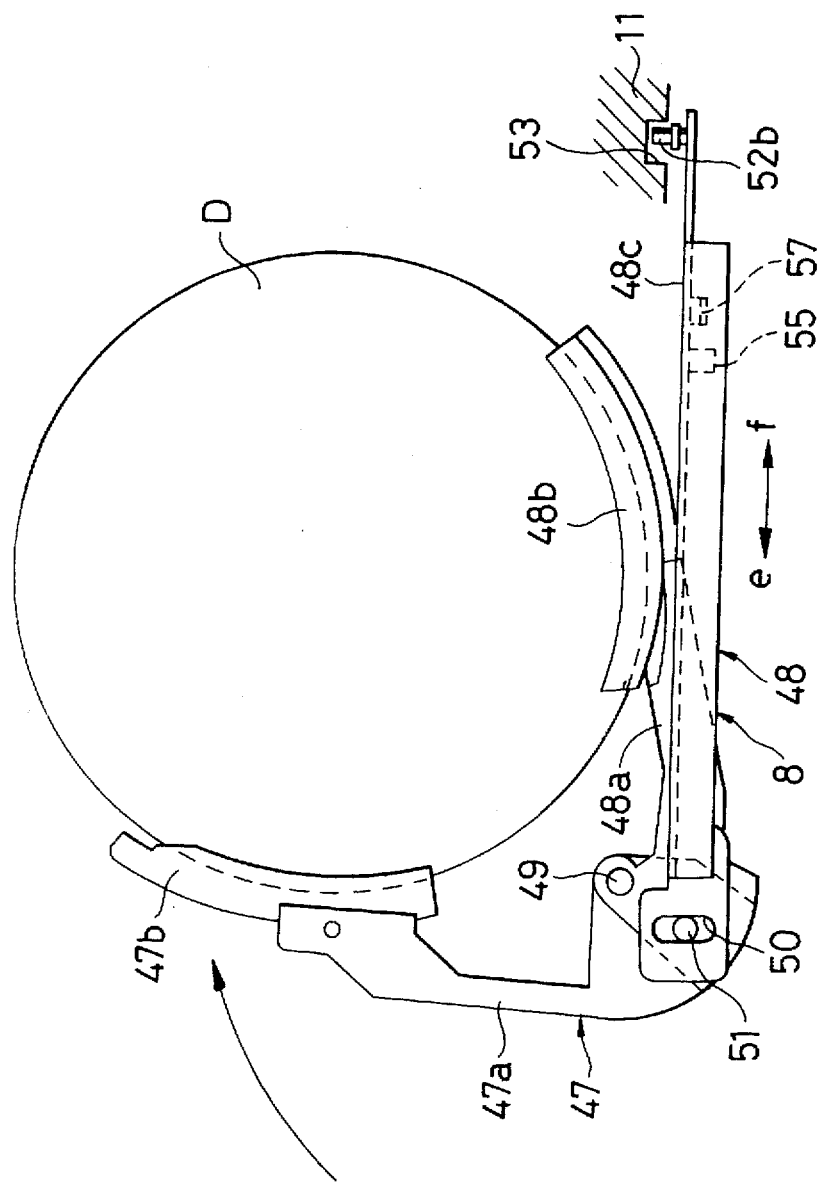
FIG. 12 is a side view showing the loading mechanism which is loading a disk.

While the cam 11 is turned to the position G (290°) with the disk D held with the disk clamping arms 47a and 48a, the two cam pins 52a and 52b are pressed by the cam groove 53, so that the two coupling bars 47c and 48c are moved forwardly (in the direction of the arrow e). Thus, the two arms 47a and 48a are backwardly swung about the pivotally supporting shaft 49, so that, as shown in FIG. 12, the disk D is placed in the disk mounting mechanism 10.

As the cam 11 is turned to the position H (320°), the cam pins 52a and 52b are pressed by the cam groove 53, so that the disk clamping arms 47a and 48a are opened being spaced away from each other, thus releasing the disk D.

Figure 13:
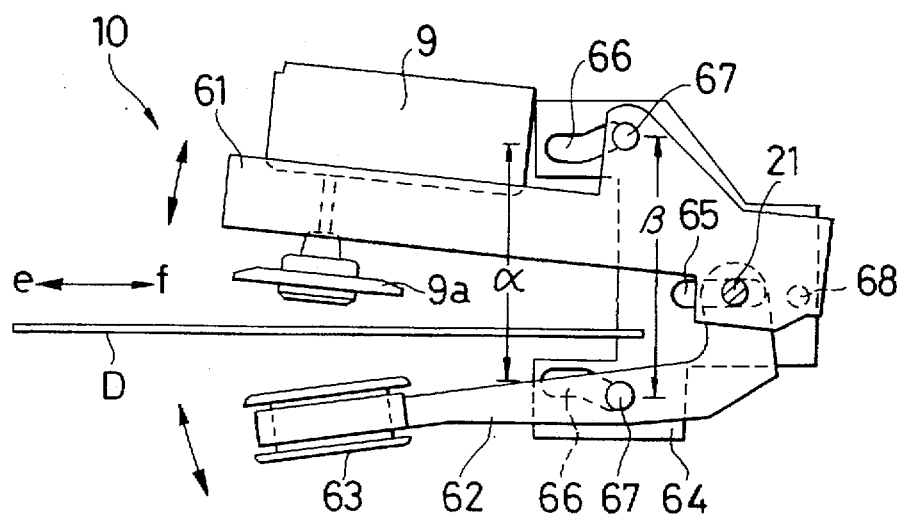
FIG. 13 is a plan view showing a disk mounting mechanism in the automatic disk changer which is going to mount a disk on the player body.
Figure 14:
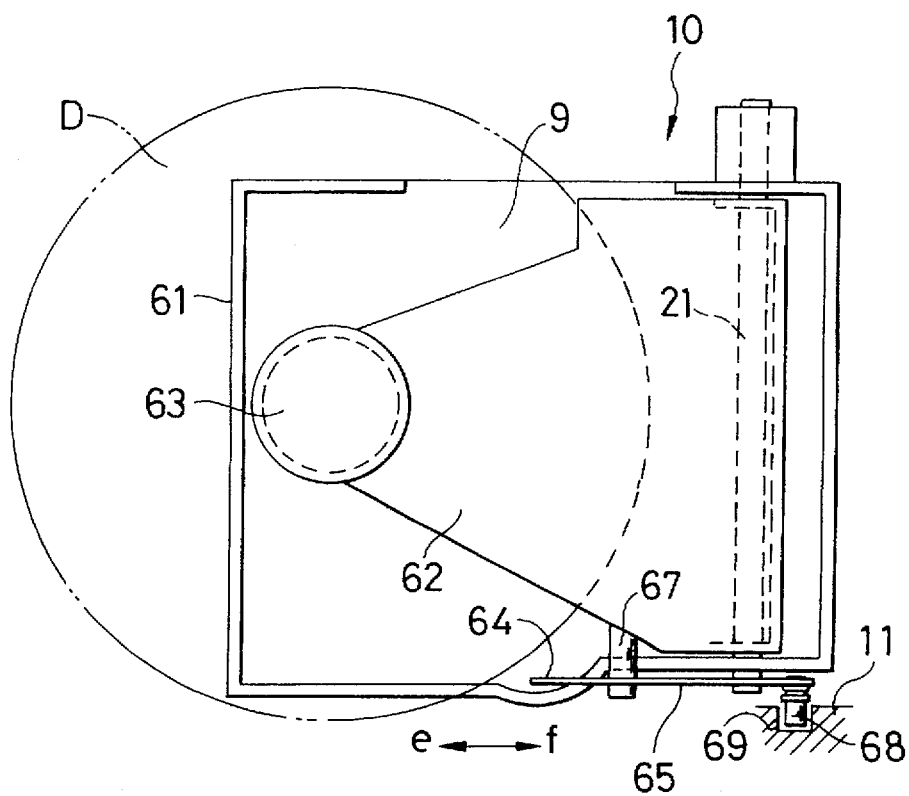
FIG. 14 is a side view of the disk mounting mechanism shown in FIG. 13.

The aforementioned disk mounting mechanism 10 is designed as shown in FIGS. 13 and 14. That is, it has a pair of swingable frames 61 and 62 which are arranged so that they can be opened and closed about the shaft 21. A player body 9 including a turn table 9a, an optical pickup, etc. is mounted on the swingable frame 61, while a disk retaining member 63 is mounted on the swingable frame 62 to detachably mount a disk on the turn table 9a. An operating board 64 is provided below the swingable frames 61 and 62 in such a manner that it is movable in the directions of the arrows e and f. The operating board 64 has an elongated hole 65 in the middle which is engaged with the supporting shaft 21. The operating board 64 is substantially in the form of a fork, having two legs. The two legs of the operating board 64 have a pair of through-holes 66, respectively which are each bent in two steps (hereinafter referred to as "bent holes 66", when applicable). The bent holes 66 are engaged with engaging pins 67 which are extended from the swingable frames 61 and 62, respectively. On the other hand, a cam pin 68 embedded in the base end portion of the operating board 64 is engaged with a cam groove 69 formed in the upper surface of the cam 11. The distance α between the front ends of the bent holes 66 is shorter than the distance β between the rear ends thereof (α<β).

Figure 15:
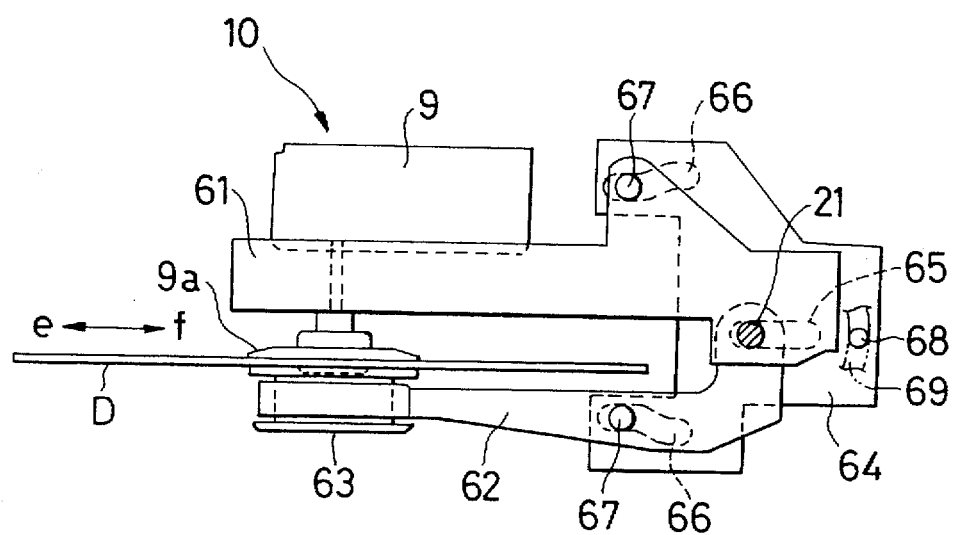
FIG. 15 is a plan view showing the disk mounting mechanism which is mounting a disk on the player body.

Before the disk mounting mechanism 10 thus constructed is operated, the swingable frames 61 and 62 are closed (as shown in FIG. 2). Under this condition, the cam 11 is turned forwardly (in the direction of the arrow c). When the cam 11 is turned to the position I (55°) from the zero position (0°), the cam pin 68 is moved forwardly (in the direction of the arrow e) by means of the cam groove 69, so that the rear ends of the bent holes 66 are engaged with the engaging pins 67, whereby the swingable frames 61 and 62 are opened, being swung about the supporting shaft 21. This condition of the swingable frames is maintained unchanged until the cam 11 is turned from the position J (85°) to the position K (260°) (cf. FIGS. 16 (a) and 17). During this period, as shown in FIG. 13, the disk D is placed between the swingable frames 61 and 62 by the loading mechanism 8. Next, while the cam 11 is turned to the position L (285°), the cam pin 68 is moved backwardly (in the direction of the arrow f) by the cam groove 69, so that the front ends of the bent holes 66 are engaged with the engaging pins 67, whereby the swingable frames 61 and 62 are closed being swung about the supporting shaft 21. As a result, as shown in FIG. 15, the disk D is held by the turn table 9a and the disk retaining member 63 being pressed from both sides, and it is mounted on the player body 9.

The aforementioned cam stop switch 13, as shown in FIG. 1, is made up of a tumbler switch, and its detecting lever 13a is engaged with an engaging section 71 of the cam 11 (cf. FIG. 16 (a)) which has two engaging edges 71a and 71b.

Let us consider the case where the cam 11 is turned forwardly (in the direction of the arrow c). At the time instant that the cam 11 is turned to the position M (335°) from the zero position (0°), the detecting lever 13a is engaged with the one engaging edge 71a of the engaging section 71, so that the cam stop switch 13 is activated to output a detection signal. In response to the detection signal, the rotation of the cam 11 is suspended. On the other hand, at the time instant that the cam 11 reaches the position N (25°) being turned from the position M in the opposite direction (in the direction of the arrow d), the detecting lever 13a is engaged with the other engaging edge 71b of the engaging section 71 of the cam, so that the cam stop switch 13 is activated to output a detection signal. In response to the detection signal, the rotation of the cam 11 is suspended.

In the automatic disk changer thus organized, the loading mechanism 8, the disk mounting mechanism 10, the locking pin 12, and the cam stop switch 13 are operated with only one cam 11. That is, the automatic disk changer is simplified in structure and reduced in manufacturing cost as much.

Figure 18:
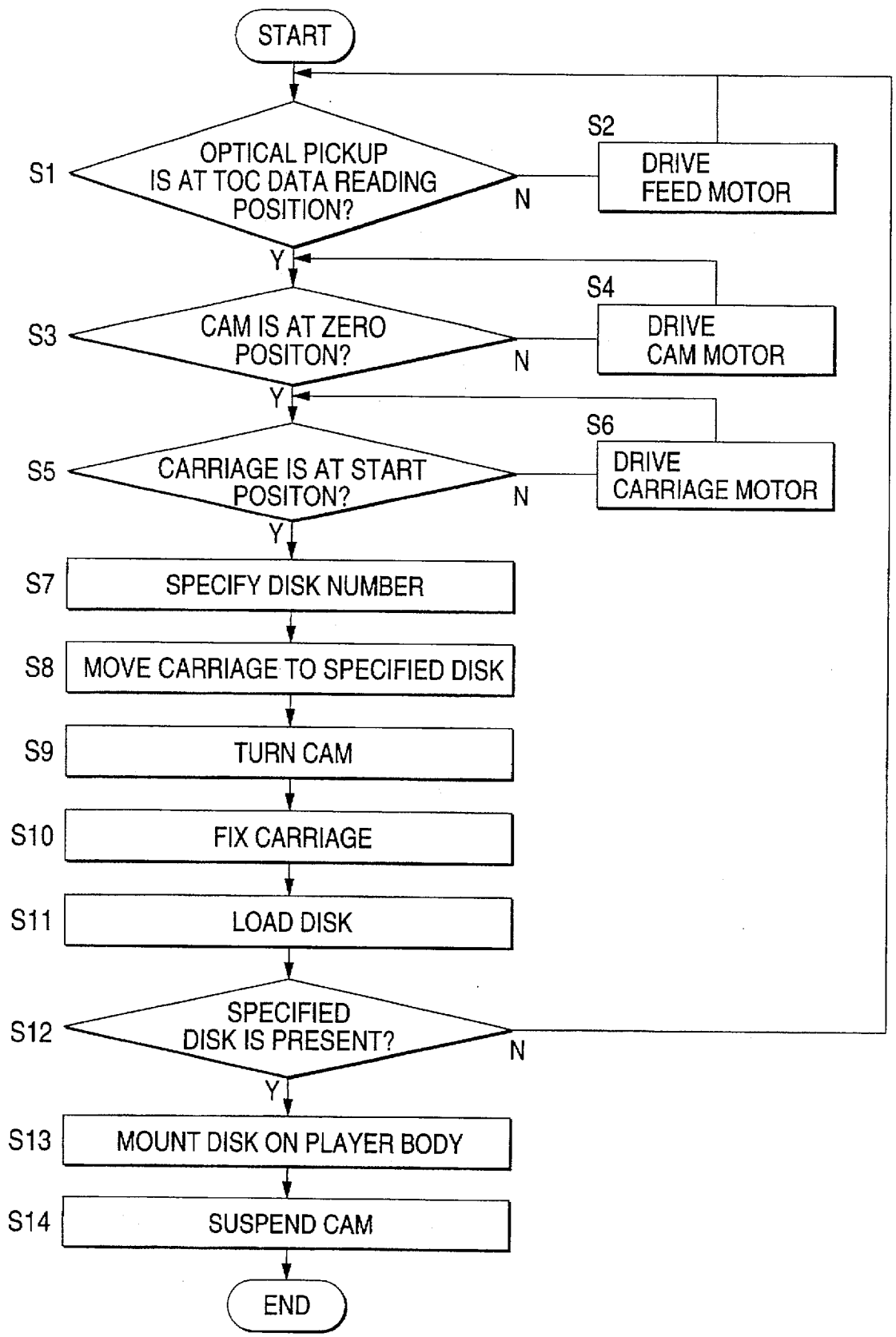
FIG. 18 is a flow chart for a description of the operation of the automatic disk changer.

The above-described loading mechanism 8, disk mounting mechanism 10, locking pin 12 and the like are controlled by a control unit (not shown) which is, for instance, made up of a microcomputer. The function of the control unit is as shown in a flow chart of FIG. 18.

That is, when the power switch 5a is turned on, the player body 9 is operated, and it is determined whether or not the optical pickup of the player body 9 is at the TOC data reading position of the disk D (Step S1). In the case where the pickup is not at the TOC data reading position, the feed motor of the player body 9 is driven until the optical pickup reaches the TOC data reading position (Step S2). Next, it is determined whether or not the cam 11 is at the zero position (0°) (Step S3). When it is not at the zero position, the cam motor 30 is driven until the cam 11 is at the zero position (Step S4). Thereafter, it is determined whether or not the carriage 7 is at the start position (Step S5). If not, the carriage motor 27 is driven until the carriage 7 comes to the start position (Step S6). Thereafter, among a number of disks D on the disk arranging stand 6, a desired one is determined, and according to the determination the disk specifying switch 5b is operated to output a specifying signal to specify the disk number thereof (Step S7). In response to the specifying signal, the control unit operates to drive the carriage motor 27 to move the carriage 7 to the desired disk D (Step S8). As a result, as shown in FIGS. 7 and 8, the disk clamping arms 47a and 48a of the loading mechanism 8 are held confronted with the specified disk D.

Under this condition, the cam 11 is turned forwardly (in the direction of the arrow c (Step S9)), so that the locking pin 12, the disk mounting mechanism 10, the loading mechanism 8, and the cam stop switch 13 are sequentially operated according to the timing chart of FIG. 16. This will be described in more detail.

First, with the aid of the cam pin 40 and the cam groove 41, the locking pin 12 is moved forwardly (in the direction of the arrow e), thus being inserted into the locking hole 43 (cf. FIGS. 5 and 6). Thus, the carriage 7 is fixedly positioned (Step S10).

Next, the disk D is loaded (Step S11). That is, after the swingable frames 61 and 62 are opened with the aid of the cam pin 68 and the cam groove 69 of the disk mounting mechanism 10 (as shown in FIG. 13), with the aid of the cam pins 52a and 52b and the cam groove 53 of the loading mechanism 8 the coupling bar 47c of the lower loading section 47 is moved forwardly (in the direction of the arrow e) while the coupling bar 48c of the side loading section 48 is moved backwardly (in the direction of the arrow f), so that the disk is held with the disk clamping arms 47a and 48a (as indicated by the solid lines in FIG. 9 and shown in FIG. 10). Thereafter, the coupling bars 47c and 48c are moved forwardly (in the direction of the arrow e), so that the disk D held with the disk clamping arms 47a and 48a is placed on the carriage 7 (cf. FIG. 12) and inserted into the space between the swingable frames 61 and 62 of the disk mounting mechanism 10 (cf. FIG. 13).

During the aforementioned disk loading operation, it is determined whether or not the specified disk D is present in the group of disks (Step S12). In the case where the specified disk D is not present therein, and it is therefore impossible for the disk clamping arms 47a and 48a to hold it, as indicated by the phantom lines in FIG. 9 the disk clamping arm 48a of the side loading section 48 is swung forwardly, while in association with the forward swing of the arm 48a the coupling bar 48c is moved backwardly (in the direction of the arrow f), so that the detecting units 55a and 55b of the disk detector 55 is abutted against the protruded piece 57; that is, the disk detector 55 is activated to output the detection signal. In response to the detection signal, the above-described operations are terminated, so that the carriage 7 is returned to its standby position.

When, as was described before, the disk D is inserted into the space between the swingable frames 61 and 62 of the disk mounting mechanism 10 (cf. FIG. 13), the swingable arms 61 and 62 are closed, so that the disk D is clamped by the disk retaining member 63 and the turn table 9a, thus being mounted on the player body 9 (Step S13). Thereafter, the detecting lever 13a of the cam stop switch 13 is engaged with the one engaging edge 71a of the engaging section 71, so that the cam stop switch 13 is activated to output the detection signal. In response to the detection signal, the rotation of the cam 11 is suspended (Step S14).

Under this condition, the player body 9 is operated to reproduce data from the disk D. After the reproduction of data, the above-described operations are carried out in the reverse order, so that the disk D is returned to its original position on the disk arranging stand 6, and the carriage 7 is returned to the standby position.

With the automatic disk changer of the invention, both the loading mechanism and the disk mounting mechanism are driven with only one cam; that is, they are driven by only one drive source. Hence, the resultant automatic disk changer is simple in structure and low in manufacturing cost.

What is claimed is:

1. An automatic disk changer comprising:

a housing;

a disk arranging stand, provided within said housing, on which a number of disks are arranged at predetermined intervals; and a carriage which is provided within said housing and is movable forwardly and backwardly along said disk arranging stand, said carriage including:

a loading mechanism for taking a desired disk out of the disks arranged on said disk arranging stand and placing said desired disk on said carriage;

a disk mounting mechanism for mounting on a player body said disk thus placed on said carriage; and 'a rotatable cam for driving said loading mechanism and said disk mounting mechanism, wherein said loading mechanism includes a lower loading section which is confronted with a lower edge of a disk, and a side loading section which is confronted with one side edge of the disk, and wherein each of said loading sections includes a disk clamping arm having a base end portion swingably mounted on said carriage, an arcuate disk clamping piece swingably coupled to an end portion of said disk clamping arm, and a coupling bar supported on said carriage so that it can be moved linearly and coupled to the base end portion of said disk clamping arm, a cam pin protruded from said coupling bar being engaged with a loading cam groove formed in said cam.

2. An automatic disk changer comprising:

a housing:

a disk arranging stand, provided within said housing, on which a number of disks are arranged at predetermined intervals; and a carriage which is provided within said housing and is movable forwardly and backwardly along said disk arranging stand, said carriage including:

a loading mechanism for taking a desired disk out of the disks arranged on said disk arranging stand and placing said desired disk on said carriage;

a disk mounting mechanism for mounting on a player body said disk thus placed on said carriage; and a rotatable cam for driving said loading mechanism and said disk mounting mechanism, wherein said disk mounting mechanism includes a pair of swingable frames which are arranged so that they can be opened and closed about a supporting shaft, one of said swingable frames having a player body and the other having a disk retaining member, and an operating board which is coupled to said swingable frames and is linearly movable, a cam pin protruded from said operating board being engaged with a cam groove formed in said cam.

3. An automatic disk changer comprising:

a housing;

a disk arranging stand, provided within said housing, on which a number of disks are arranged at predetermined intervals; and a carriage which is provided within said housing and is movable forwardly and backwardly along said disk arranging stand, said carriage including:

a loading mechanism for taking a desired disk out of the disks arranged on said disk arranging stand and placing said desired disk on said carriage;

a disk mounting mechanism for mounting on a player body said disk thus placed on said carriage; and a rotatable cam for driving said loading mechanism and said disk mounting mechanism, wherein said carriage includes a locking pin which is driven by said cam to detachably engage with said disk arranging stand, thereby to lock said carriage at a predetermined position, and wherein said locking pin is protruded from a movable plate which is linearly movable, a cam pin protruded from said movable plate being engaged with a locking-pin cam groove formed in said cam.

* * * * *